United States Patent
Yang et al.

(10) Patent No.: US 10,888,065 B2
(45) Date of Patent: Jan. 12, 2021

(54) FEEDING TRAY

(71) Applicants: Tianle Yang, Guangdong (CN); Yibao Zeng, Guangdong (CN)

(72) Inventors: Tianle Yang, Guangdong (CN); Yibao Zeng, Guangdong (CN)

( * ) Notice: Subject to any disclaimer, the term of this patent is extended or adjusted under 35 U.S.C. 154(b) by 263 days.

(21) Appl. No.: 16/047,030

(22) Filed: Jul. 27, 2018

(65) Prior Publication Data

US 2018/0368357 A1    Dec. 27, 2018

Related U.S. Application Data

(63) Continuation-in-part of application No. 15/169,687, filed on May 31, 2016, now abandoned.

(30) Foreign Application Priority Data

Feb. 17, 2016  (CN) ..................... 2016 2 0125225 U
Feb. 17, 2016  (CN) ..................... 2016 2 0125798 U

(51) Int. Cl.
*A01K 5/01*     (2006.01)
*A01K 15/02*    (2006.01)

(52) U.S. Cl.
CPC .......... *A01K 5/0114* (2013.01); *A01K 15/025* (2013.01)

(58) Field of Classification Search
CPC .. A01K 15/025; A01K 5/0114; A01K 5/0128; A01K 5/0142
See application file for complete search history.

(56) References Cited

U.S. PATENT DOCUMENTS

| | | | | |
|---|---|---|---|---|
| 3,722,476 A * | 3/1973 | Van Ness | ............. | A01K 5/0114 119/61.54 |
| 4,722,299 A * | 2/1988 | Mohr | ................... | A01K 15/025 119/707 |
| 5,000,123 A * | 3/1991 | Morse | ................. | A01K 5/0114 119/61.54 |
| 5,009,193 A * | 4/1991 | Gordon | ................ | A01K 15/025 119/707 |
| 5,269,261 A * | 12/1993 | McCance | ............ | A01K 15/025 119/706 |
| 5,351,650 A * | 10/1994 | Graves | ................. | A01K 15/025 119/707 |
| 5,517,945 A * | 5/1996 | Udelle | ................. | A01K 15/024 119/608 |

(Continued)

FOREIGN PATENT DOCUMENTS

| | | | | |
|---|---|---|---|---|
| DE | 202015000231 U1 * | 2/2015 | .......... | A01K 15/025 |
| DE | 202015003253 U1 * | 6/2015 | .......... | A01K 15/025 |

(Continued)

*Primary Examiner* — Magdalena Topolski
*Assistant Examiner* — Morgan T Barlow

(57) ABSTRACT

A feeding tray belongs to the technical field of pet products. The feeding tray includes a tray body and a base. The tray body is detachably fixed to the base. A plurality of through-holes are provided in the tray body. Each of the through-holes penetrates through the tray body in a thickness direction. The feeding tray further includes a plurality of connecting pillars. Each of the connecting pillars is inserted into a corresponding one of the through-holes, and each of the connecting pillars is capable of rotating about its own axis. Each of the connecting pillars is provided with a first boss on the outer surface thereof.

10 Claims, 3 Drawing Sheets

(56) References Cited

U.S. PATENT DOCUMENTS

| | | | | |
|---|---|---|---|---|
| 5,517,948 A * | 5/1996 | Udelle | A01K 15/025 | 119/706 |
| 5,529,017 A * | 6/1996 | Udelle | A01K 15/024 | 119/706 |
| 5,536,007 A * | 7/1996 | Snyder | A63F 7/04 | 273/118 R |
| 5,540,187 A * | 7/1996 | Udelle | A01K 15/025 | 119/706 |
| 5,544,623 A * | 8/1996 | Udelle | A01K 15/025 | 119/706 |
| 5,572,955 A * | 11/1996 | Boshears | A01K 15/024 | 119/706 |
| 5,595,142 A * | 1/1997 | Chill | A01K 5/0114 | 119/710 |
| 5,680,831 A * | 10/1997 | Udelle | A01K 13/00 | 119/609 |
| 5,724,914 A * | 3/1998 | Nemeth | A01K 5/0114 | 119/61.55 |
| 5,785,005 A * | 7/1998 | Udelle | A01K 15/025 | 119/706 |
| 5,809,938 A * | 9/1998 | Baiera | A01K 15/025 | 119/707 |
| 6,186,095 B1 * | 2/2001 | Simon | A01K 15/025 | 119/707 |
| 7,806,087 B2 * | 10/2010 | Plante | A01K 15/025 | 119/707 |
| D633,661 S * | 3/2011 | Kellogg | A01K 15/024 | D30/160 |
| 8,807,082 B1 * | 8/2014 | Alfonso | A01K 5/0142 | 119/51.5 |
| 9,510,564 B2 * | 12/2016 | Valle | A01K 15/026 | |
| 9,756,835 B1 * | 9/2017 | Ottosson | A01K 15/026 | |
| 9,814,994 B1 * | 11/2017 | Woods | A63H 5/00 | |
| 2002/0185073 A1 * | 12/2002 | Fullerton | A01K 15/02 | 119/51.01 |
| 2003/0221633 A1 * | 12/2003 | Werde | A01K 15/025 | 119/707 |
| 2006/0005774 A1 * | 1/2006 | Newman Bornhofen | A01K 5/0135 | 119/61.5 |
| 2006/0213447 A1 * | 9/2006 | Kitchen | A01K 5/0114 | 119/61.5 |
| 2009/0025644 A1 * | 1/2009 | Ebert | A01K 5/0114 | 119/61.5 |
| 2009/0038559 A1 * | 2/2009 | Markham | A01K 15/026 | 119/707 |
| 2009/0041910 A1 * | 2/2009 | Rabinovitch | A01K 5/0128 | 426/115 |
| 2010/0058994 A1 * | 3/2010 | Siklosi | A01K 15/025 | 119/707 |
| 2010/0224138 A1 * | 9/2010 | Axelrod | A23K 40/20 | 119/710 |
| 2011/0253059 A1 * | 10/2011 | Wong | A01K 15/025 | 119/702 |
| 2011/0297093 A1 * | 12/2011 | Lai | A01K 5/0225 | 119/54 |
| 2012/0167827 A1 * | 7/2012 | Rochon | A01K 5/0114 | 119/51.01 |
| 2012/0192806 A1 * | 8/2012 | Dixon | A01K 15/025 | 119/707 |
| 2012/0204799 A1 * | 8/2012 | Desrosiers | A01K 5/0114 | 119/61.54 |
| 2014/0060442 A1 * | 3/2014 | Ressemann | A01K 13/00 | 119/61.5 |
| 2014/0158054 A1 * | 6/2014 | Clarke | A01K 5/00 | 119/51.01 |
| 2014/0251231 A1 * | 9/2014 | Hansen | A01K 15/025 | 119/710 |
| 2015/0059652 A1 * | 3/2015 | Rabideau | A01K 15/024 | |
| 2015/0296746 A1 * | 10/2015 | Ottosson | A01K 15/025 | |
| 2016/0242388 A1 * | 8/2016 | Chiou | A01K 15/024 | |
| 2016/0242389 A1 * | 8/2016 | Price | A01K 15/025 | |
| 2017/0071155 A1 * | 3/2017 | Gailen | A47J 47/005 | |
| 2017/0112093 A1 * | 4/2017 | Glinsky | A01K 5/0291 | |
| 2017/0290296 A1 * | 10/2017 | Simon | A01K 15/026 | |

FOREIGN PATENT DOCUMENTS

| | | | | |
|---|---|---|---|---|
| DE | 202015103355 U1 * | 7/2015 | | A01K 15/025 |
| EP | 2047742 A2 * | 4/2009 | | A01K 5/0128 |
| FR | 2474277 A1 * | 7/1981 | | A01K 5/0114 |
| WO | WO-2017163111 A1 * | 9/2017 | | A01K 5/0114 |

* cited by examiner

FEEDING TRAY

CROSS-REFERENCE TO RELATED APPLICATIONS

The present application is a continuation-in-part application of U.S. application Ser. No. 15/169,687 filed on May 31, 2016, which claims the benefit of Chinese Utility Model Application Nos. 201620125225.4 and 201620125798.7, both filed on Feb. 17, 2016. The contents of all the above are hereby incorporated by reference.

TECHNICAL FIELD

The present invention belongs to the technical field of pet products and relates to a feeding tray.

BACKGROUND

According to the survey, 34% of the pet dogs are overweight in the world, and obesity may cause pet muscle tissue diseases, skeletal problems, lack of patience during activities, cardiovascular problems, etc., and may damage the immune system. In view of the fact that the current excessively fast eating speed causes the obesity of the pet dogs and a series of digestive system problems, it is necessary to provide a piece of novel tableware capable of controlling the eating speed of a pet.

SUMMARY

The present invention provides a feeding tray aiming at the above problems existing in the prior art. The technical problem to be solved by the present invention is how to control the eating speed of a pet.

The purpose of the present invention may be achieved by the following technical solutions:

A feeding tray, wherein the feeding tray comprises a tray body and a base, the tray body is detachably fixed to the base, a plurality of through-holes are provided in the tray body, each of the through-holes penetrates through the tray body in a thickness direction, the feeding tray further comprises a plurality of connecting pillars, each of the connecting pillars is inserted into a corresponding one of the through-holes, each of the connecting pillars is capable of rotating about its own axis, and each of the connecting pillars is provided with a first boss on the outer surface thereof.

The feeding tray comprises a tray body and a base. A plurality of connecting pillars are rotated about its own axis and are connected to the tray body, respectively. There is a gap between the connecting pillars. In use, the food fed to a pet is placed on the tray body, and the food is distributed between the connecting pillars. When the pet is eating, the connecting pillars play a certain role of blocking the mouth of the pet, thus limiting the distance between the mouth of the pet and the food, so that it is difficult for the pet to directly obtain food through the mouth. In general, the pet can only eat through the tongue by a small amount, which effectively delays the eating speed of the pet and controls the eating speed of the pet. In addition, each of the connecting pillars is provided with a first boss on the outer surface thereof. By rotating one or more connecting pillars, the distance between the first boss on the rotated connecting pillar and the adjacent connecting pillar changes inevitably, or the distance between the first boss on the rotated connecting pillar and the first boss on the adjacent connecting pillar also changes. The change in these distances can further control the eating speed of the pet. For example, when the distance is increased as described above, the mouth of the pet can reach between the connecting pillars more conveniently to increase the eating speed; or, when the distance is reduced as described above, it is inconvenient for the mouth of the pet to reach between the connecting pillars, thus slowing down the eating speed.

In the feeding tray described above, the outer surface of each of the connecting pillars is further provided with a second boss, and the first boss and the second boss on each of the connecting pillars are located at different heights and are both located on opposite sides of the corresponding connecting pillar. In this structure, by rotating one or more connecting pillars, the distance between the first boss or the second boss on the rotated connecting pillar and the adjacent connecting pillar changes inevitably, or the distance between the first boss or the second boss on the rotated connecting pillar and the first boss on the adjacent connecting pillar also changes. The change in these distances can further control the eating speed of the pet.

In the feeding tray described above, each of the through-holes is annular, each of the connecting pillars is cylindrical, each of the connecting pillars is made of elastic material, the bottom of each of the connecting pillars is provided with a first ledge and a second ledge, both the first ledge and the second ledge are annular and have an outer diameter larger than the inner diameter of each of the through-holes, there is a gap between the first ledge and the second ledge, the outer diameter of the connecting pillar is less than the inner diameter of the corresponding through-hole, and the first ledge and the second ledge are located above and below the tray body, respectively. The elastic material may be a soft material such as silicone rubber or TPR. In this structure, the first ledge and the second ledge play a role of an axial limit on the connecting pillars. The outer diameter of the connecting pillar is smaller than the inner diameter of the corresponding through-hole so as to facilitate the pet to use the claws or the mouth to rotate the connecting pillar. The connecting pillar made of elastic material enables the pet to have a good sense of touch. When installed, the second ledge is compressed and deformed so as to be able to pass through the corresponding through-hole. After passing through the corresponding through-hole, the second ledge returns to its original shape and lies below the tray body, limiting the axial movement of the connecting pillar.

In the feeding tray described above, both the upper surface and the lower surface of the tray body are flat, and the first ledge and the second ledge abut against the upper surface and the lower surface of the tray body, respectively. In this structure, the first ledge and the second ledge play a role of assisting in positioning the connecting pillar, preventing the connecting pillar from swinging in the process of rotating, and improving the stability of the connecting pillar in rotation.

In the feeding tray described above, each of the through-holes is evenly distributed on the tray body. This structure enables each of the connecting pillars to be evenly distributed on the tray body and enables the food sprinkled on the tray body to be more evenly distributed.

In the feeding tray described above, the bottom wall of the base is provided with an annular third ledge, the tray body is fixed to the top of the third ledge, the third ledge and the bottom wall of the base define a receiving cavity, the connecting pillar is provided with an inner cavity, the inner cavity is communicated with the receiving cavity, a plurality of vent holes are provided on the outer surface of the connecting pillar, and each of the vent holes is communicated with the inner cavity. The receiving cavity is used to store things emitting odor such as cat grass and snacks and attract pets to eat and play.

In the feeding tray described above, the vent holes on each of the connecting pillars are all evenly distributed in the axial direction of the connecting pillars.

In the feeding tray described above, the base is annular, the edge of the base is provided with a first flange, the first flange is also annular, and an annular slide is formed between the first flange and the third ledge. The first flange is used to prevent food from falling. The annular slide may also serve as a track through which a ball rolls. The ball is placed on the slide so that the pet may roll the ball for entertainment.

In the feeding tray described above, the bottom of the tray body is provided with a plurality of inserting rods, the base is provided with a plurality of inserting holes, the number of the inserting holes is the same as that of the inserting rods, each of the inserting rods is inserted and fixed to the corresponding inserting hole, the bottom wall of the base is provided with a plurality of strip-shaped ribs, each of the strip-shaped ribs is located in the third ledge, and the end of each of the strip-shaped ribs is fixedly connected with the third ledge. The inserting rod is inserted into the corresponding inserting hole to achieve fixing the base to the tray body. It is also convenient to detach the structure. The strip-shaped ribs serve to increase the strength of the base.

In the feeding tray described above, a plurality of anti-slip mats are fixed to the bottom of the base, and the anti-slip mats are made of silicone rubber material. The anti-slip mats are provided at the bottom of the base so as to prevent the pet from moving the base when eating or playing.

In the feeding tray described above, the tray body is provided with a check ring on its periphery and the check ring is annular.

Compared with the prior art, the advantages of the present invention are as follows.

1. The connecting pillars of the feeding tray play a certain role of blocking the mouth of a pet, and are capable of effectively delaying the eating speed of a pet and controlling the eating speed of a pet.

2. The feeding tray is simple in structure and low in manufacturing cost. The feeding tray not only can effectively control the food intake of a pet, but also can be provided for the pet to play, stimulate the interest of the pet in eating, train the intelligence of the pet, and can also free the owner from accompanying the pet to do other things at the same time. The elastic material of the connecting pillar also enables the pet to have a good sense of touch, and can effectively improve the eating experience of the pet; at the same time, the detachable and combinable design of the tray body makes the package smaller, facilitates storage, reduces transportation cost, and can also be freely combined at the same time with a variety of uses.

Figure 1:
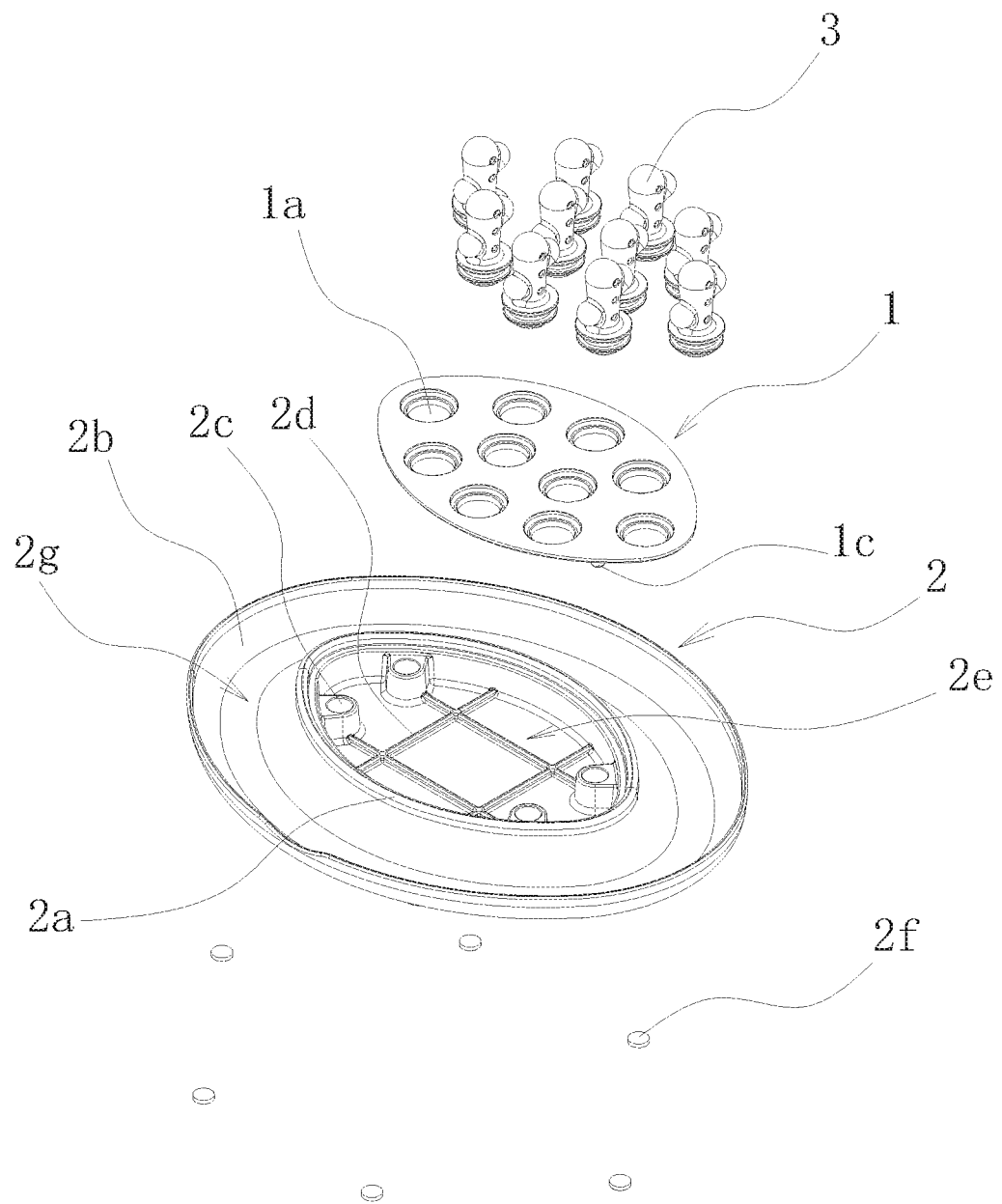
FIG. 1 is an exploded view illustrating a feeding tray in a first embodiment.

In the drawings, 1, a tray body; 1a, a through-hole; 1b, a check ring; 1c, an inserting rod; 2, a base; 2a, a third ledge; 2b, a first flange; 2c, an inserting hole; 2d, a strip-shaped rib; 2e, a receiving cavity; 2f, an anti-slip mat; 2g, a slide; 3, a connecting pillar; 3a, a first boss; 3b, a second boss; 3c, a first ledge; 3d, a second ledge; 3e, an inner cavity; 3f, a vent hole; 4, a ball.

DESCRIPTION OF THE EMBODIMENTS

The specific embodiments of the present invention are described below, and the technical solutions of the present invention are further described with reference to the accompanying drawings. However, the present invention is not limited to these embodiments.

A First Embodiment

Figure 2:
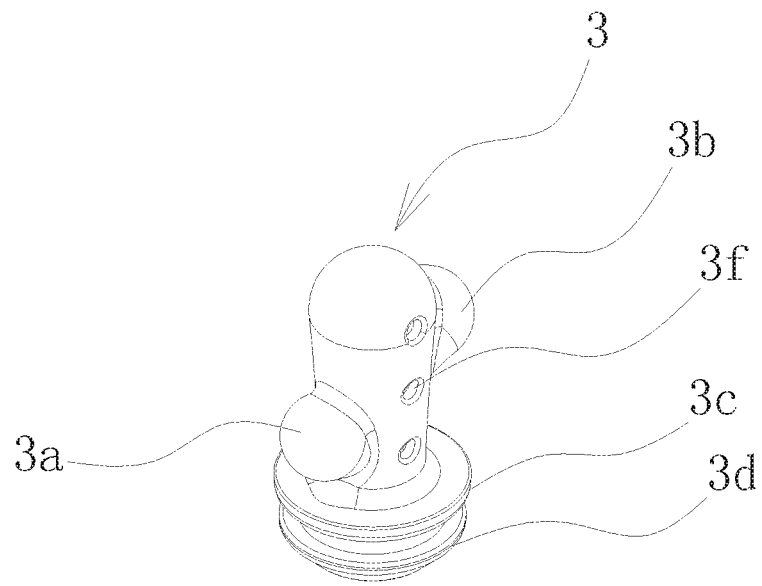
FIG. 2 is a schematic view illustrating the structure of a connecting pillar.

As shown in FIGS. 1-2, the feeding tray comprises a tray body 1 and a base 2, the tray body 1 is detachably fixed to the base 2, a plurality of through-holes 1a are provided in the tray body 1, each of the through-holes 1a penetrates through the tray body 1 in a thickness direction, the feeding tray further comprises a plurality of connecting pillars 3, each of the connecting pillars 3 is inserted into a corresponding one of the through-holes 1a, each of the connecting pillars 3 is capable of rotating about its own axis, and each of the connecting pillars 3 is provided with a first boss 3a on the outer surface thereof.

As shown in FIG. 2, in the present embodiment, the outer surface of each of the connecting pillars 3 is further provided with a second boss 3b, and the first boss 3a and the second boss 3b on each of the connecting pillars 3 are located at different heights and are both located on opposite sides of the corresponding connecting pillar 3. In this structure, by rotating one or more connecting pillars 3, the distance between the first boss 3a or the second boss 3b on the rotated connecting pillar 3 and the adjacent connecting pillar 3 changes inevitably, or the distance between the first boss 3a or the second boss 3b on the rotated connecting pillar 3 and the first boss 3a on the adjacent connecting pillar 3 also changes. The change in these distances can further control the eating speed of the pet.

As shown in FIG. 1, in the present embodiment, each of the through-holes 1a is annular, each of the connecting pillars 3 is cylindrical, each of the connecting pillars 3 is made of elastic material, the bottom of each of the connecting pillars 3 is provided with a first ledge 3c and a second ledge 3d, both the first ledge 3c and the second ledge 3d are annular and have an outer diameter larger than the inner diameter of each of the through-holes 1a, there is a gap between the first ledge 3c and the second ledge 3d, the outer diameter of the connecting pillar 3 is less than the inner diameter of the corresponding through-hole 1a, and the first ledge 3c and the second ledge 3d are located above and below the tray body 1, respectively. The elastic material may be a soft material such as silicone rubber or TPR. In this structure, the first ledge 3c and the second ledge 3d play a role of an axial limit on the connecting pillars 3. The outer diameter of the connecting pillar 3 is smaller than the inner diameter of the corresponding through-hole 1a so as to facilitate the pet to use the claws or the mouth to rotate the connecting pillar 3. The connecting pillar 3 made of elastic material enables the pet to have a good sense of touch. When installed, the second ledge 3d is compressed and deformed so as to be able to pass through the corresponding through-hole 1a. After passing through the corresponding through-hole, the second ledge 3d returns to its original shape and lies below the tray body, limiting the axial movement of the connecting pillar 3.

Preferably, both the upper surface and the lower surface of the tray body 1 are flat, and the first ledge 3c and the second ledge 3d abut against the upper surface and the lower surface of the tray body 1, respectively. In this structure, the first ledge 3c and the second ledge 3d play a role of assisting in positioning the connecting pillar 3, preventing the connecting pillar 3 from swinging in the process of rotating, and improving the stability of the connecting pillar 3 in rotation.

As shown in FIG. 1, in the present embodiment, each of the through-holes 1a is evenly distributed on the tray body 1. This structure enables each of the connecting pillars 3 to be evenly distributed on the tray body 1 and enables the food sprinkled on the tray body 1 to be more evenly distributed.

Figure 3:
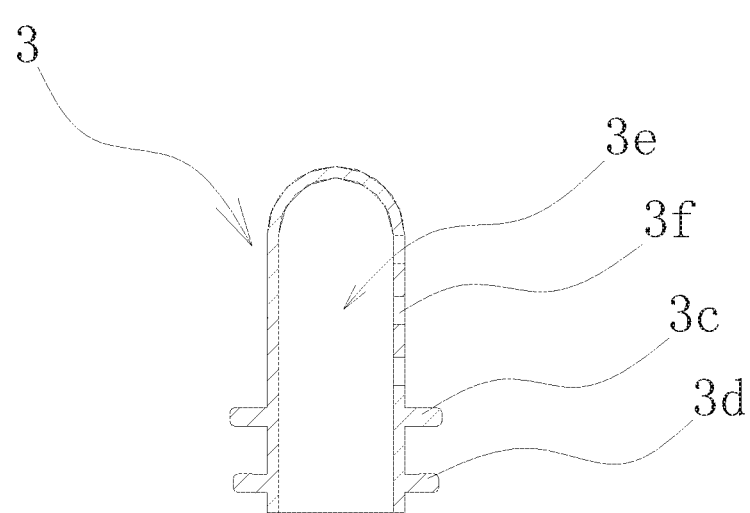
FIG. 3 is a cross-sectional view illustrating a connecting pillar.

As shown in FIGS. 2-3, in the present embodiment, the bottom wall of the base 2 is provided with an annular third ledge 2a, the tray body 1 is fixed to the top of the third ledge 2a, the third ledge 2a and the bottom wall of the base 2 define a receiving cavity 2e, the connecting pillar 3 is provided with an inner cavity 3e, the inner cavity 3e is communicated with the receiving cavity 2e, a plurality of vent holes 3f are provided on the outer surface of the connecting pillar 3, and each of the vent holes 3f is communicated with the inner cavity 3e. The receiving cavity 2e is used to store things emitting odor such as cat grass and snacks and attract pets to eat and play.

As shown in FIG. 2 or FIG. 3, in the present embodiment, the vent holes 3f on each of the connecting pillars 3 are all evenly distributed in the axial direction of the connecting pillars 3.

As shown in FIG. 1, in the present embodiment, the base 2 is annular, the edge of the base 2 is provided with a first flange 2b, the first flange 2b is also annular, and an annular slide 2g is formed between the first flange 2b and the third ledge 2a. The first flange 2b is used to prevent food from falling. The annular slide 2g may also serve as a track through which a ball 4 rolls. The ball 4 is placed on the slide 2g so that the pet may roll the ball 4 for entertainment.

As shown in FIG. 1, in the present embodiment, the bottom of the tray body 1 is provided with a plurality of inserting rods 1c, the base 2 is provided with a plurality of inserting holes 2c, the number of the inserting holes 2c is the same as that of the inserting rods 1c, each of the inserting rods 1c is inserted and fixed to the corresponding inserting hole 2c, the bottom wall of the base 2 is provided with a plurality of strip-shaped ribs 2d, each of the strip-shaped ribs 2d is located in the third ledge 2a, and the end of each of the strip-shaped ribs 2d is fixedly connected with the third ledge 2a. The inserting rod 1c is inserted into the corresponding inserting hole 2c to achieve fixing the base 2 to the tray body 1. It is also convenient to detach the structure. The strip-shaped ribs 2d serve to increase the strength of the base 2.

As shown in FIG. 1, in the present embodiment, a plurality of anti-slip mats 2f are fixed to the bottom of the base 2, and the anti-slip mats 2f are made of silicone rubber material. The anti-slip mats 2f are provided at the bottom of the base so as to prevent the pet from moving the base 2 when eating or playing.

A Second Embodiment

Figure 4:
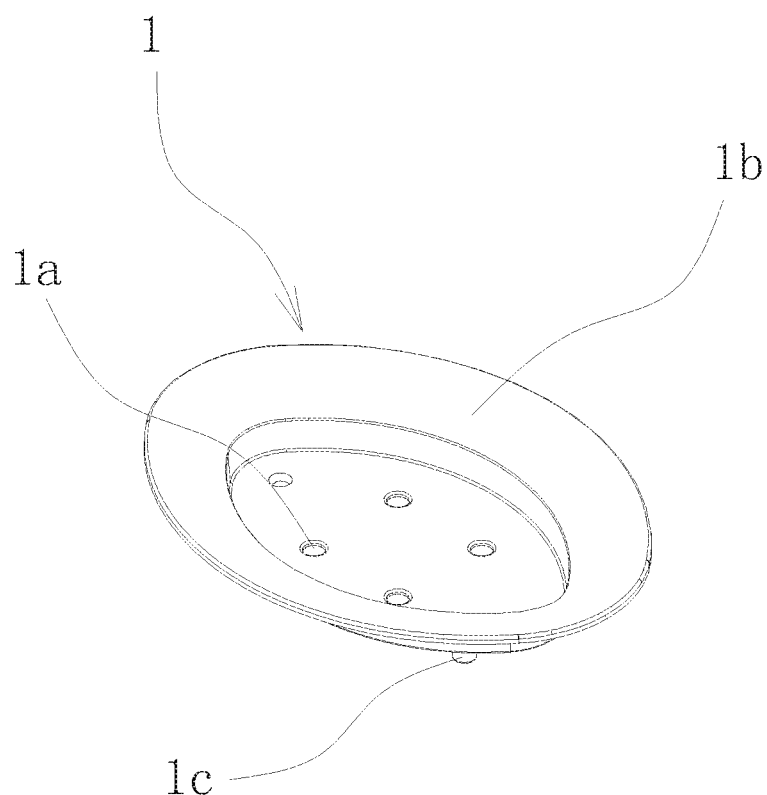
FIG. 4 is a schematic view illustrating the structure of a tray body in a second embodiment.
Figure 5:
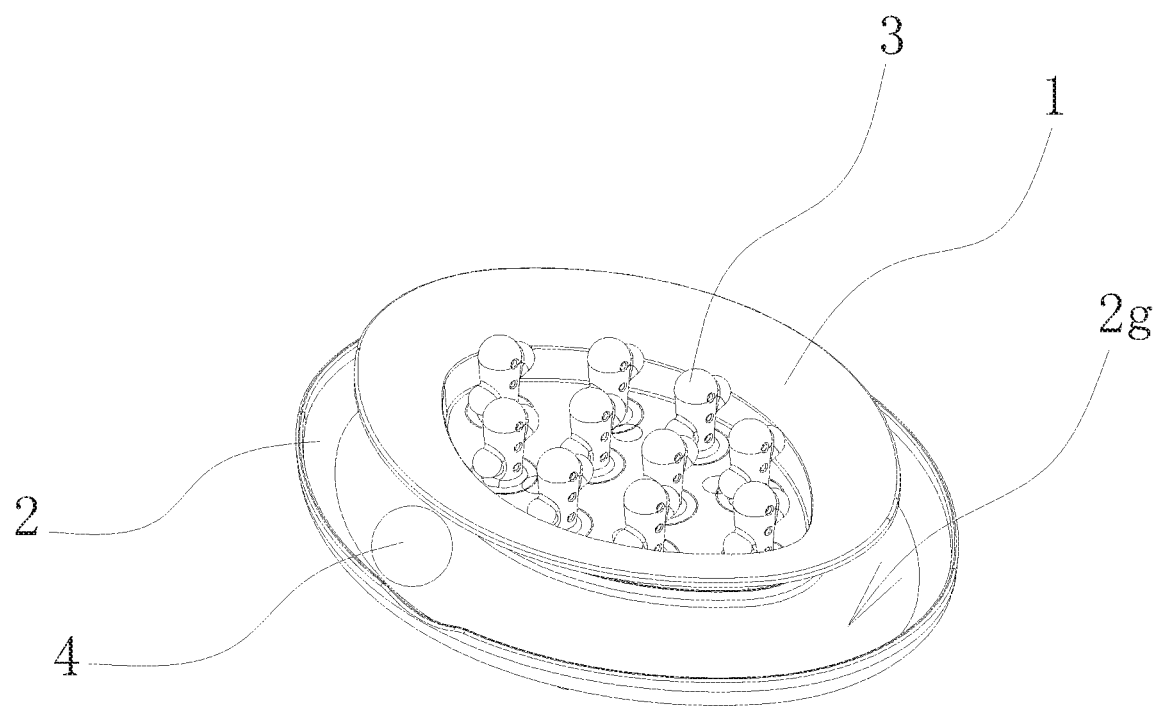
FIG. 5 is an assembly view illustrating a feeding tray in a second embodiment.

As shown in FIG. 4, in the present embodiment, the tray body 1 is provided with a check ring 1b on its periphery and the check ring 1b is annular. FIG. 5 is an assembly view illustrating the feeding tray. In the present embodiment, a ball 4 is placed on the feeding tray, and the ball 4 can roll on the slide 2g.

The specific embodiments described herein are merely illustrative of the spirit of the present invention. Those skilled in the art to which the present invention pertains may make various modifications or additions to the described specific embodiments or substitute the described specific embodiments in a similar manner without departing from the spirit of the present invention or going beyond the scope defined by the appended claims.

What is claimed is:

1. A feeding tray, comprising:
a tray body (1);
and a base (2),
the tray body (1) being detachably fixed to the base (2),
a plurality of through-holes (1a) being provided in the tray body (1), each of the through-holes (1a) penetrating through the tray body (1) in a thickness direction,
the feeding tray further comprising:
a plurality of connecting pillars (3), each of the connecting pillars (3) being inserted into a corresponding one of the through-holes (1a), each of the connecting pillars (3) being capable of rotating about its own axis, and each of the connecting pillars (3) being provided with a first boss (3a) on an outer surface thereof;
wherein a bottom wall of the base (2) is provided with an annular third ledge (2a), the tray body (1) is fixed to the top of the third ledge (2a), the third ledge (2a) and the bottom wall of the base (2) define a receiving cavity (2e), the connecting pillar (3) is provided with an inner cavity (3e), the inner cavity (3e) is communicated with the receiving cavity (2e), a plurality of vent holes (3f) are provided on the outer surface of the connecting pillar (3), and each of the vent holes (30 is communicated with the inner cavity (3e).

2. The feeding tray according to claim 1, wherein the outer surface of each of the connecting pillars (3) is further provided with a second boss (3b), and the first boss (3a) and the second boss (3b) on each of the connecting pillars (3) are located at different heights and are both located on opposite sides of the corresponding connecting pillar (3).

3. The feeding tray according to claim 2, wherein each of the through-holes (1a) is annular, each of the connecting pillars (3) is cylindrical, each of the connecting pillars (3) is made of elastic material, a bottom of each of the connecting pillars (3) is provided with a first ledge (3c) and a second ledge (3d), both the first ledge (3c) and the second ledge (3d) are annular and each of the first ledge (3c) and the second ledge (3d) has an outer diameter larger than an inner diameter of each of the through-holes (1a), there is a gap between the first ledge (3c) and the second ledge (3d), an outer diameter of the connecting pillar (3) is less than the inner diameter of the corresponding through-hole (1a), and the first ledge (3c) and the second ledge (3d) are located above and below the tray body (1), respectively.

4. The feeding tray according to claim 3, wherein both an upper surface and a lower surface of the tray body (1) are flat, and the first ledge (3c) and the second ledge (3d) abut against the upper surface and the lower surface of the tray body (1), respectively.

5. The feeding tray according to claim 1, wherein each of the through-holes (1a) is evenly distributed on the tray body (1).

6. The feeding tray according to claim 1, wherein the vent holes (30 on each of the connecting pillars (3) are all evenly distributed in an axial direction of the each of the connecting pillars (3).

7. The feeding tray according to claim 1, wherein the base (2) is annular, an edge of the base (2) is provided with a first flange (2b), the first flange (2b) is also annular, and an annular slide (2g) is formed between the first flange (2b) and the third ledge (2a).

8. The feeding tray according to claim 1, wherein a bottom of the tray body (1) is provided with a plurality of inserting rods (1c), the base (2) is provided with a plurality of inserting holes (2c), the number of the inserting holes (2c) is the same as that of the inserting rods (1c), each of the inserting rods (1c) is inserted and fixed to the corresponding inserting hole (2c), the bottom wall of the base (2) is provided with a plurality of strip-shaped ribs (2d), each of the strip-shaped ribs (2d) is located in the third ledge (2a), and an end of the each of the strip-shaped ribs (2d) is fixedly connected with the third ledge (2a).

9. The feeding tray according to claim 8, wherein a plurality of anti-slip mats (20 are fixed to the bottom wall of the base (2), and the anti-slip mats (20 are made of silicone rubber material.

10. The feeding tray according to claim 1, wherein the tray body (1) is provided with a retaining ring (1b) on its periphery and the retaining ring (1b) is annular.

\* \* \* \* \*